United States Patent
Joung et al.

(10) Patent No.: US 7,415,020 B2
(45) Date of Patent: Aug. 19, 2008

(54) PACKET CLASSIFICATION APPARATUS AND METHOD USING FIELD LEVEL TRIES

(75) Inventors: Jinoo Joung, Yongin-si (KR); Woo-jong Park, Seoul (KR); Guansong Zhang, Brooklyn, NY (US); H. Jonathan Chao, Brooklyn, NY (US)

(73) Assignees: Samsung Electronics Co., Ltd., Suwon-si (KR); Polytechnic University, Brooklyn, NY (US)

( * ) Notice: Subject to any disclaimer, the term of this patent is extended or adjusted under 35 U.S.C. 154(b) by 810 days.

(21) Appl. No.: 10/787,298

(22) Filed: Feb. 27, 2004

(65) Prior Publication Data

US 2004/0170170 A1   Sep. 2, 2004

(30) Foreign Application Priority Data

Feb. 28, 2003  (KR)  ............... 10-2003-0012902

(51) Int. Cl.
*H04L 12/28* (2006.01)
(52) U.S. Cl. ................... 370/392; 370/386; 707/3; 707/101; 707/102
(58) Field of Classification Search ........... 370/392, 370/389, 386; 707/100, 3, 6, 101, 102
See application file for complete search history.

(56) References Cited

U.S. PATENT DOCUMENTS

| | | | |
|---|---|---|---|
| 6,289,013 B1 * | 9/2001 | Lakshman et al. | 370/389 |
| 6,341,130 B1 * | 1/2002 | Lakshman et al. | 370/389 |
| 6,560,610 B1 * | 5/2003 | Eatherton et al. | 707/104.1 |
| 6,798,778 B1 * | 9/2004 | Bergantino et al. | 370/392 |
| 7,002,965 B1 * | 2/2006 | Cheriton | 370/395.32 |
| 7,227,842 B1 * | 6/2007 | Ji et al. | 370/235 |
| 2003/0233516 A1 * | 12/2003 | Davis et al. | 711/108 |

FOREIGN PATENT DOCUMENTS

EP   1 122 927 A2   8/2001

(Continued)

OTHER PUBLICATIONS

Butler Lampson (IP Lookups Using Multiway and Multicolumn Search, IEEE vol. 7, No. 3, Jun. 1999).*

(Continued)

*Primary Examiner*—Ricky Ngo
*Assistant Examiner*—Kibrom T Hailu
(74) *Attorney, Agent, or Firm*—Sughrue Mion, PLLC (57) ABSTRACT

A packet classification apparatus and method using field level tries includes a main processing part for generating and maintaining the field level tries, which organize a multi-field packet by field in a hierarchical structure for classifications; and classification engines, each of which is provided with a first classification part for performing queries and updates and processing a prefix lookup represented by an IP source/destination address lookup, and a second classification part for proceeding with classifications by corresponding field based on a result of the first classification part in order to process a range lookup belonging to the result. Accordingly, tries in the unit of a field are developed so that packet classifications for high-speed networking with excellent query performance are secured, and wherein approximately a half-million classifier rules can be processed.

13 Claims, 7 Drawing Sheets

FOREIGN PATENT DOCUMENTS

| | | |
|---|---|---|
| JP | 2001-223750 A | 8/2001 |
| JP | 2002-305539 A | 10/2002 |
| WO | WO 02/082709 A2 | 10/2002 |

OTHER PUBLICATIONS

Nikkei Electronics Nov. 30, 1998 (No. 731), "System of Pipeline merge sort", pp. 153-160.

Pankaj Gupta, et al., "Algorithms for Packet Classification", IEEE Network, vol. 15, Issue 2, Mar.-Apr. 2001.

Srinivasan V et al:, "Fast and Scalable Layer Four Switching", Computer Communication Review, Association for Computing Machinery, New York, US, vol. 28, No. 4, Oct. 1998, pp. 191-202, XP000914435.

Lampson B et al: "IP lookups using multiway and multicolumn search", Infocom '98. Seventeenth Annual Joint Conference of the IEEE Computer and Communications Societies. Proceedings. IEEE San Francisco, CA, USA Mar. 29-Apr. 2, 1998, New York, NY, USA, IEEE, US, Mar. 29, 1998, pp. 1248-1256, XP010270337.

* cited by examiner

SIMPLE ONE-STEP CLASSIFICATION

POINT TO A NODE IN A NEXT LEVEL

PACKET CLASSIFICATION APPARATUS AND METHOD USING FIELD LEVEL TRIES

CROSS-REFERENCE TO RELATED APPLICATIONS

This application claims the benefit of Korean Patent Application No. 10-2003-0012902 filed Feb. 28, 2003 in the Korean Intellectual Property Office, the disclosure of which is incorporated herein by reference.

BACKGROUND

1. Field of the Invention

Apparatuses and methods consistent with the present invention relate to processing entries such as packets and the like in communication systems, and more particularly to a packet classification method using field level tries in classifying packets in routers and a packet classification apparatus implementing the method.

2. Description of the Related Art

In processing packets in communication systems such as the Internet, each transit node in the packet-forwarding path interprets a destination address and then decides to which output node or link a packet is forwarded. In various communication systems, diverse types of services are provided based on a destination address, origination address, or other data in a header of each packet. The different types of services include, for example, priorities in treating or forwarding packets, fares to be paid for the transmissions, packet-processing rejections to specific senders, etc.

Since current systems may process enormous amounts of packets (in general, data entries), the systems find out the content from the received packets and decide in which forms packets are processed, accordingly, in a very short time and at a high speed.

In order to provide users with more advanced services such as service level agreements, virtual private networking (VPN), QoS, and so on, over future IP networks, IP packets incoming from routers and the like are to be classified based on a desired standard, which is referred to as "packet classification". This packet classification is performed based on multi-field lookup in the long run since values of various packet fields are looked up.

In other words, the packet classification is performed through processing packets with reference to various fields, such as a source address field, a destination address field, a protocol ID field, a port number field, and so on, in one packet, differently from existing IP destination address lookup. Therefore, more time and memory are basically required, and a method solving such a problem has not been fully studied.

Figure 1:
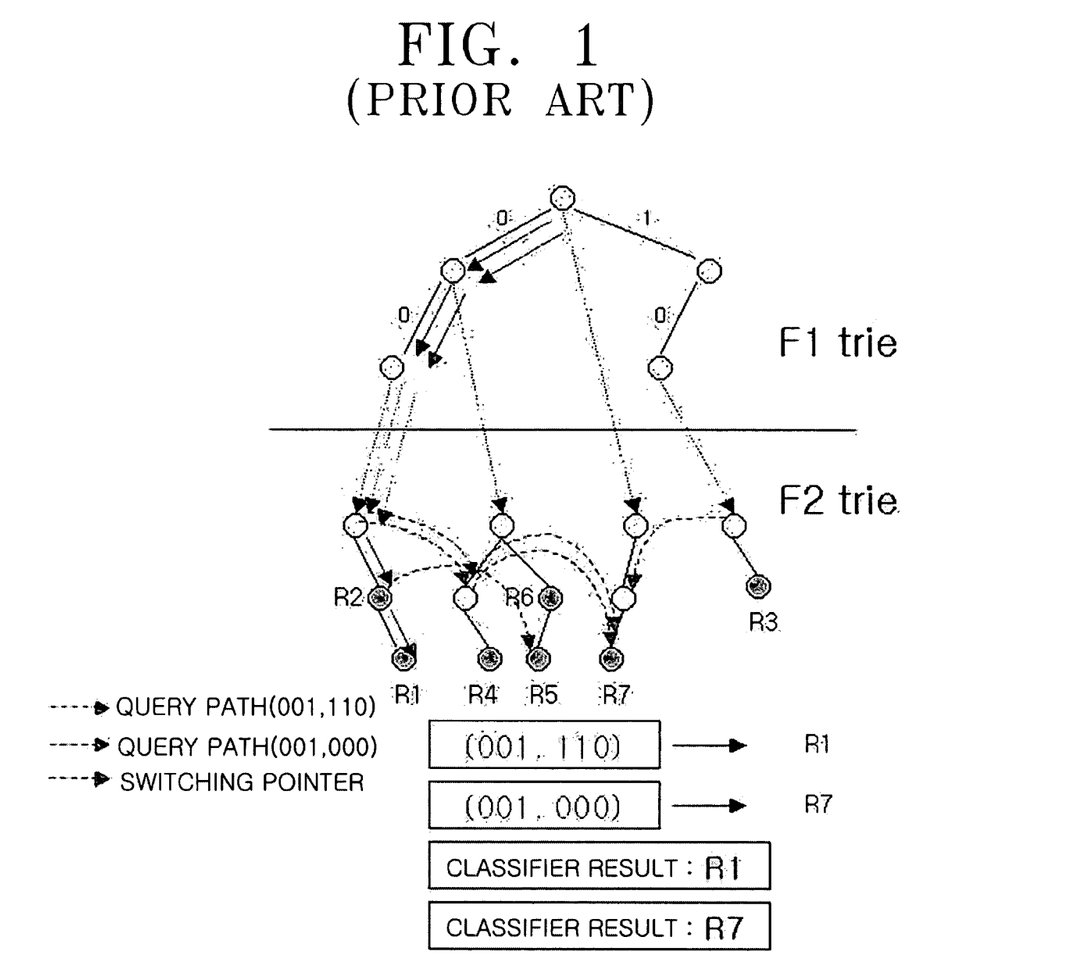
FIG. 1 is a view for showing a grid-of-tries-based data structure for a conventional packet classification method.
Figure 2:
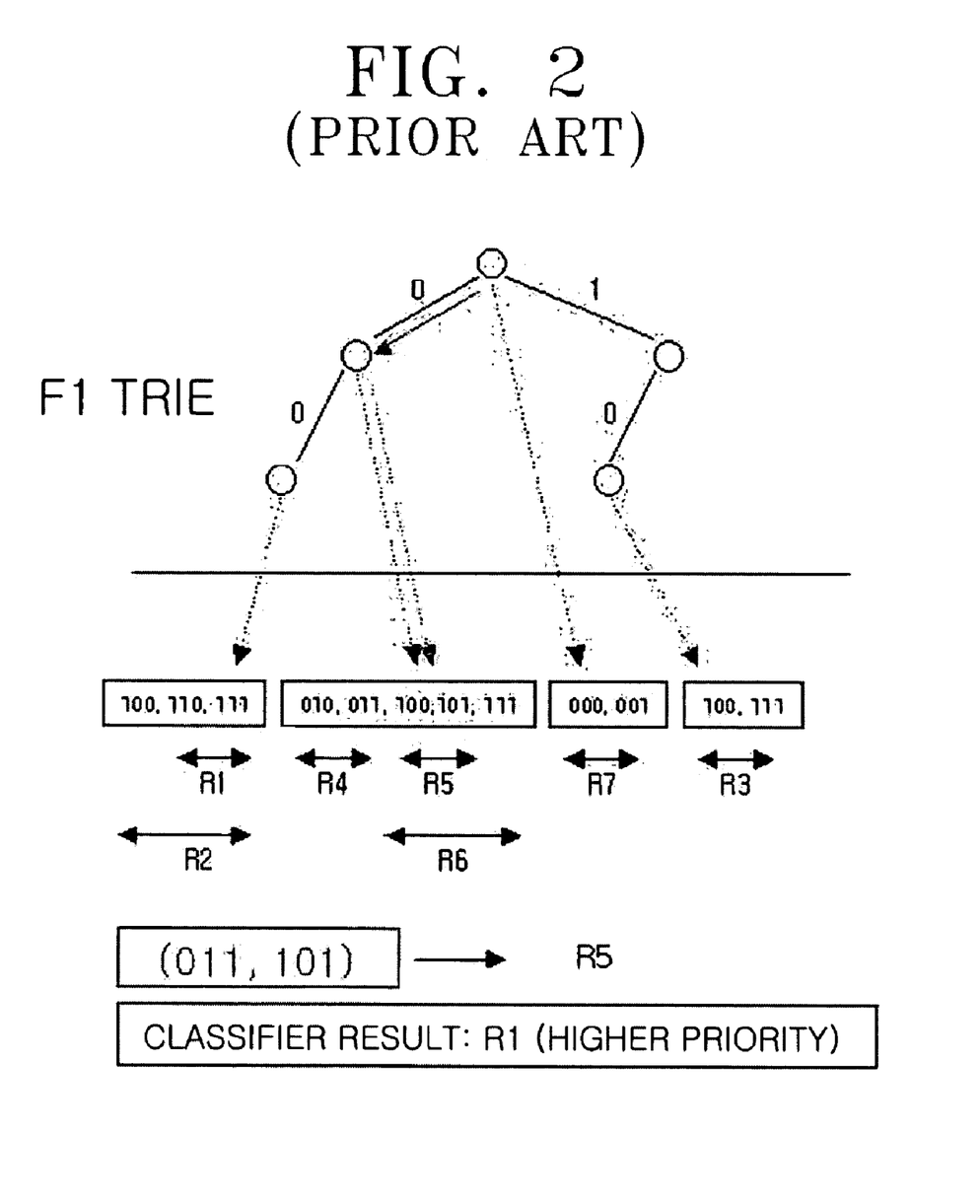
FIG. 2 is a view for showing a principle of the range lookup for a conventional packet classification method.
Figure 3:
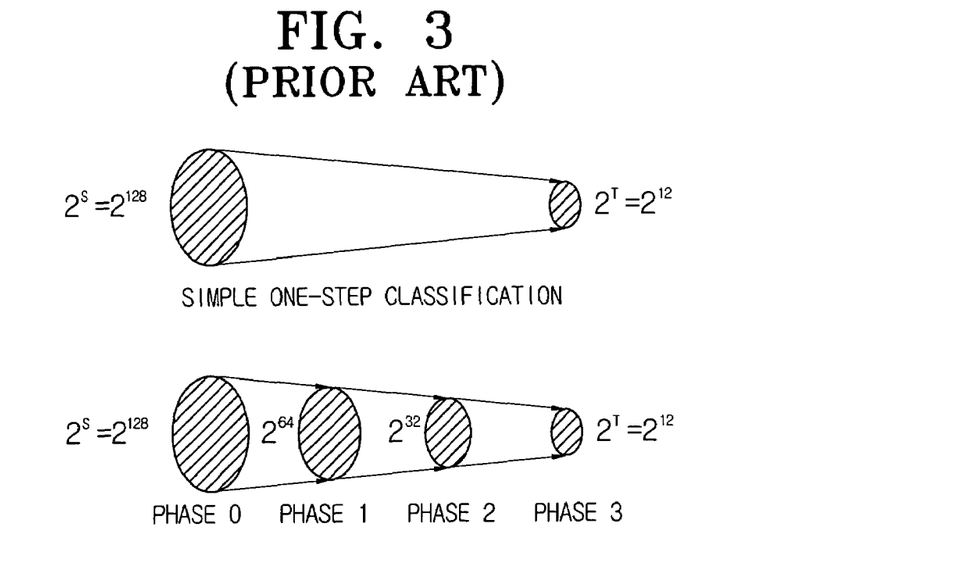
FIG. 3 is a view for showing a principle of the recursive flow classification for a conventional packet classification method.

FIG. 1 to FIG. 3 are views for illustrating conventional packet classification methods.

Table 1 shows a packet classifier for configuring conventional methods.

TABLE 1

| Filter | F1 | F2 |
|--------|-----|-----|
| $R_1$ | 00* | 11* |
| $R_2$ | 00* | 1* |
| $R_3$ | 10* | 1* |
| $R_4$ | 0* | 01* |
| $R_5$ | 0* | 10* |
| $R_6$ | 0* | 1* |
| $R_7$ | * | 00* |

Typical methods for conventional packet classification include the grid-of-tries as shown in FIG. 1, a geometric method represented by the range lookup of FIG. 2, a heuristic method represented by a recursive flow classification of FIG. 3, and so on.

Of these methods, a data structure based on the grid-of-tries combines advantages of the standard hierarchical trie and the set-pruning trie, and has the query time complexity of O (dW) and the storage complexity of O (NdW), based on the number of header fields d (i.e., dimension) of W bit length on which N classification rules apply. These characteristics are obtained to introduce a switch pointer into a data structure. However, the formation of the switch pointer in bit level ensures the storage complexity of O (NdW), and a query procedure must be implemented bit by bit. Real applications asking for implementations do not accept the bit-by-bit query procedure (or classification).

In classifying packets, important considerations include classification rates, memory size, the number of classification rules, the number of reference fields, rule update time, and worst-case performances.

That is, in order for the packet classification to secure maximum performances using an available memory, it is important to solve the problems relating to achieving high performances for given storage limitations.

SUMMARY

The present invention may solve at least some of the above problems, and accordingly, it is an exemplary aspect of the present invention to provide packet classification apparatus and method using field level tries, which improve query performances by forming tries in a unit of a field rather than the conventional tries formed in a unit of bits, dealing with prefix implementations and range implementations with the use of ternary content addressable memory (TCAM) and k-way searches.

In order to achieve the above exemplary aspect and/or other exemplary features of the present invention, a packet classification apparatus using field level tries is provided. More specifically, an illustrative, non-limiting packet classification apparatus according to the present invention has a main processing part for generating and maintaining the field level tries, which organize a multi-field packet by field in a hierarchical structure for classifications, and plural classification engines each provided with a first classification part for performing queries and updates and processing a prefix lookup represented by an IP source/destination address lookup, and a second classification part for proceeding with classifications by corresponding field based on a result of the first classification part in order to process a range lookup belonging to the result.

The classification engines each include a classification processor and a memory.

Further, the main processing part and the classification engines are connected through a broadcasting bus.

Preferably, but not necessarily, the first classification part stores fields of a prefix format and uses a ternary content addressable memory (TCAM) for searching the stored fields.

Preferably, but not necessarily, the second classification part uses a k-way search scheme having an appropriate value k based on usage and specification.

Further, the main processing part sends an update instruction to the plural classification engines through the broadcasting bus, and the classification engines receiving the update instruction instruct changes to the contents of their corresponding memories.

The field level tries are organized in a structure wherein the fields of a first group appear in an upper level and the fields of a second group appear in a lower level.

If two nodes in any level have a common child node, the field level tries generate and share only one node.

In the field level tries, a level for the prefix lookup exists as only one level having a pair of prefixes combined to each other.

According to an exemplary aspect of the present invention, a packet classification method for a routing system includes the steps of developing by field packets having multi-fields and forming field level tries, processing a prefix lookup with respect to packet classification rules by using the field level tries, and processing a range lookup after the prefix lookup processing.

BRIEF DESCRIPTION OF THE DRAWINGS

The invention will be described in detail with reference to the following drawings in which like reference numerals refer to like elements, and wherein.

DETAILED DESCRIPTION OF ILLUSTRATIVE, NON-LIMITING EMBODIMENTS

Hereinafter, the present invention will be described in detail with reference to the accompanying drawings.

Figure 4:
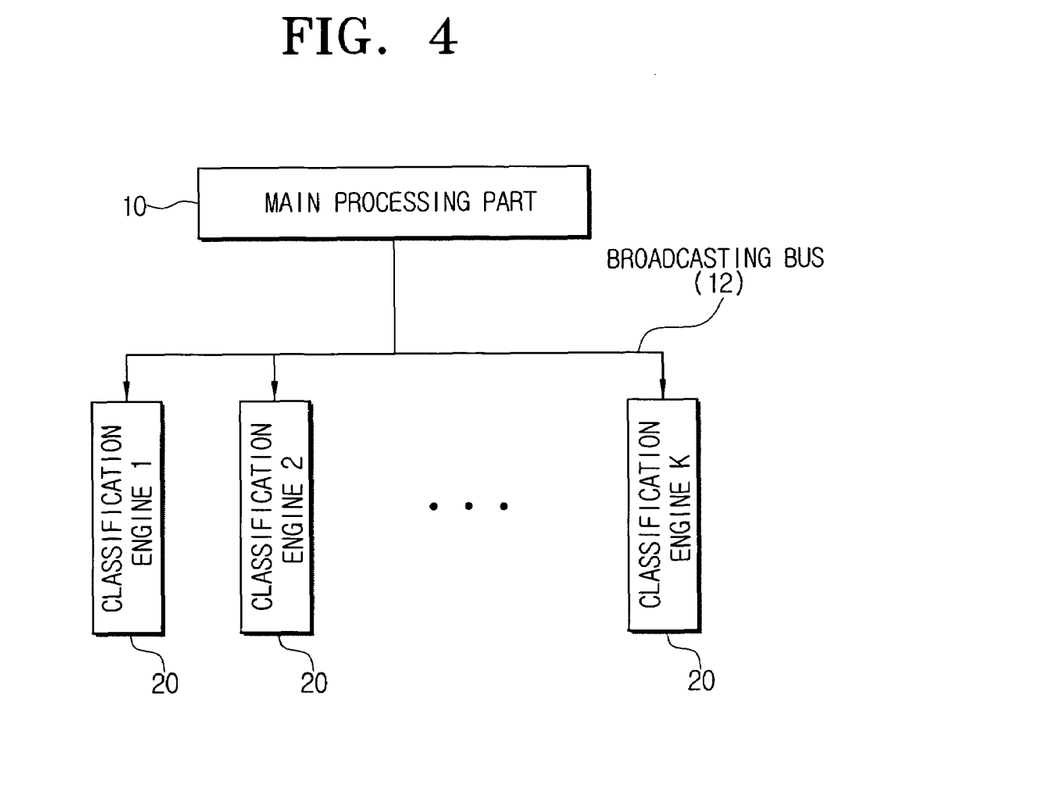
FIG. 4 is a view for showing a structure of a packet classification apparatus using field level tries according to an illustrative embodiment of the present invention.

FIG. 4 is a view for showing a packet classification apparatus using field level tries according to an illustrative embodiment of the present invention.

As shown in FIG. 4, the packet classification apparatus using field level tries has a main processing part 10 and plural classification engines 20.

The main processing part 10 forms and manages a field level trie (FLT) data structure, and processes and provides information to the respective classification engines 20. The classification engines 20 belonging to respective interfaces substantially classify individual incoming packets.

In a high speed/core router, a packet classification is generally performed in parallel in each line card. Therefore, each line card has at least one built-in classification engine. Due to a required bandwidth of a transmission link, the classification engines are optimized to query functions.

The packet classification scheme using a field level trie according to an illustrative embodiment of the present invention is a hybrid scheme that combines the TCAM technology and the k-way search and deals with the prefix implementations and the range implementations.

However, the classification is dynamic, and a data structure needs changing (e.g., updating) from time to time. The data organization in a classification engine may be inappropriate to updates such as insertions or deletions of rules.

The classifications are the same in respective line cards, and it is preferable, but not necessary, to have update functions executed in a central line card.

The main processing part 10 is provided with a powerful processor in general, and is disposed on a board separated from the line cards.

Figure 6:
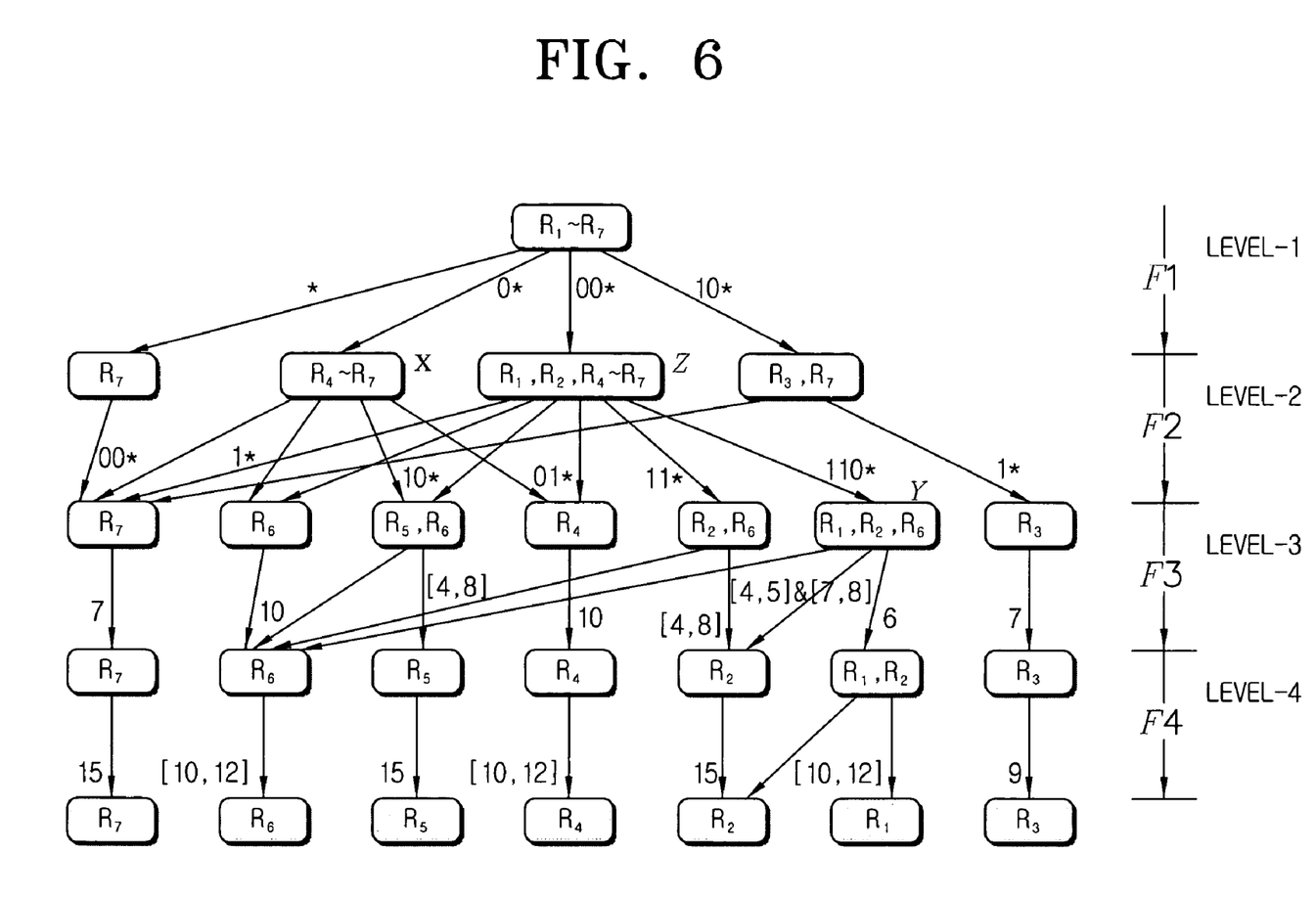
FIG. 6 is a view for showing a data structure constructing a classifier of Table 2 in field level tries.
Figure 7:
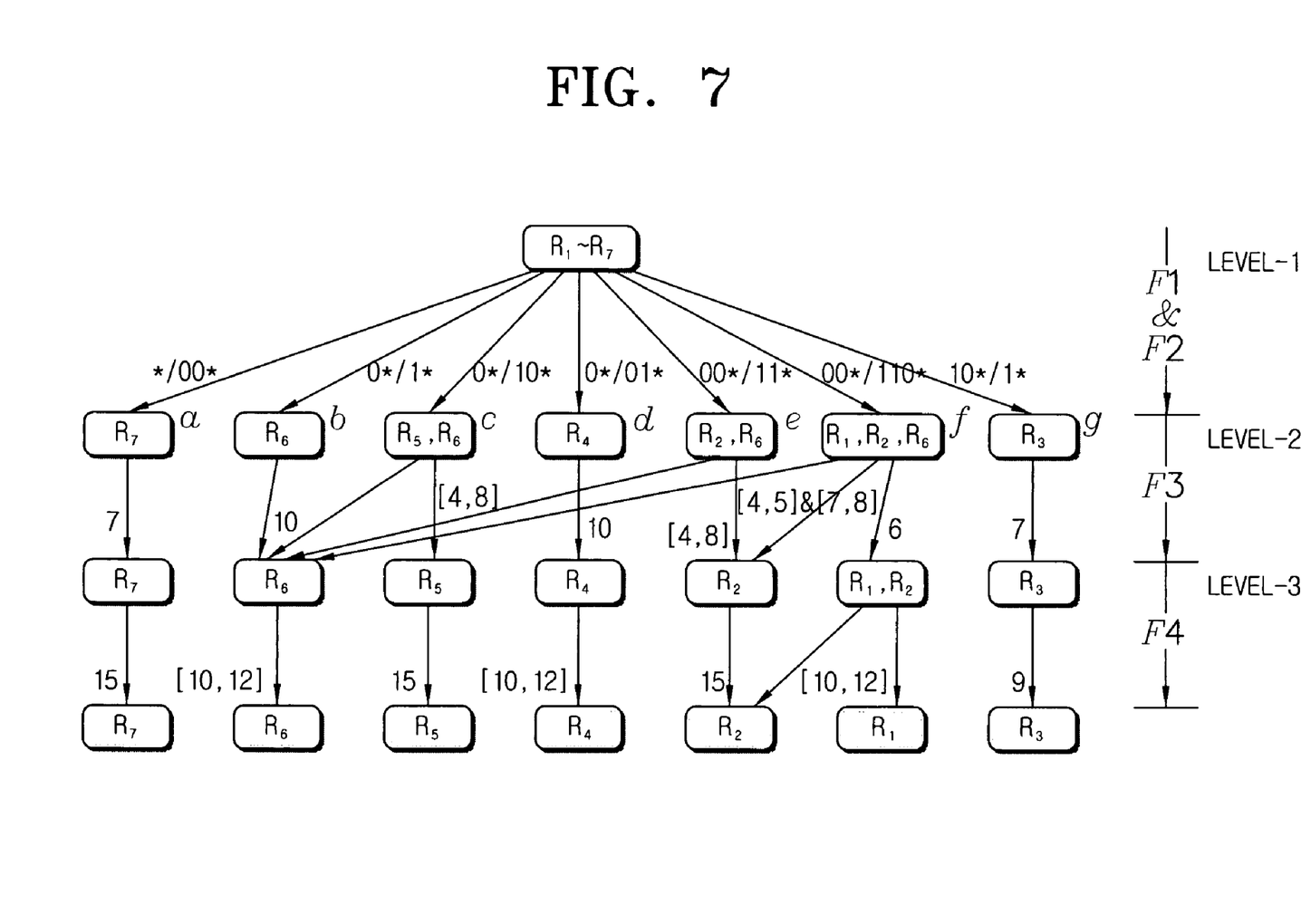
FIG. 7 is a view for showing a shortened data structure for a prefix lookup of FIG. 6 by applying the TCAM to the classification engines of FIG. 5.
Figure 8A:
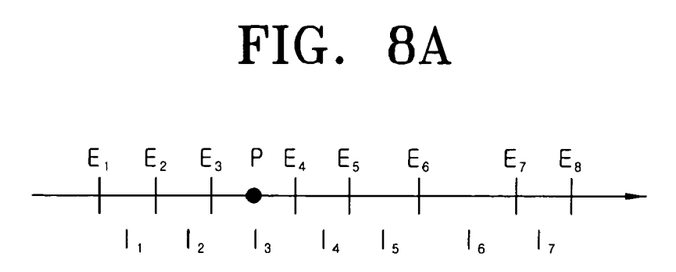
FIG. 8A and FIG. 8B are views for explaining a principle of the k-way search being carried out in a micro engine for the range lookup in the classification engines of FIG. 5.
Figure 8B:
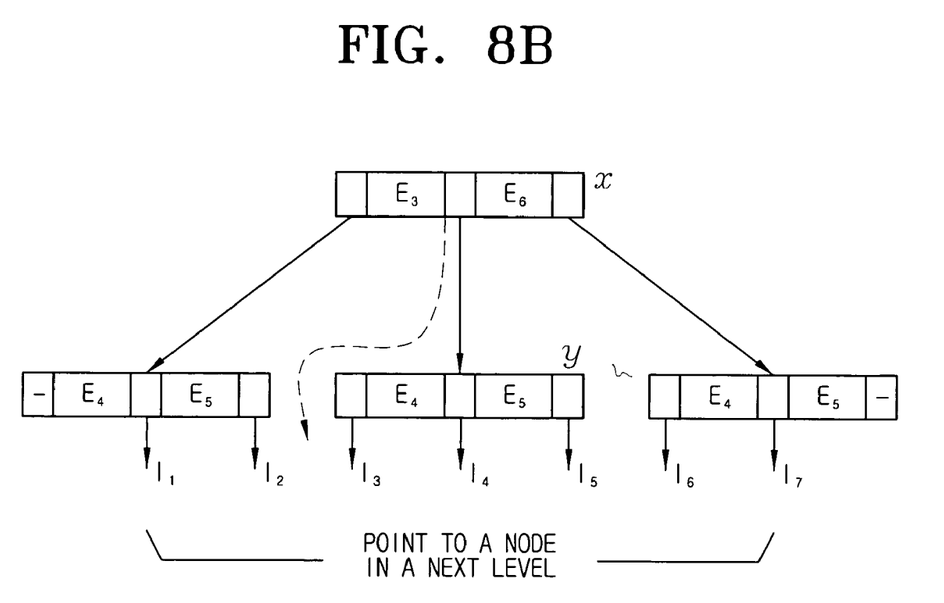

The main processing part 10 maintains an entire data structure used for classification, and changes the data structure when the classification needs to be updated. FIG. 6 to FIG. 8 show data structures according to an illustrative embodiment of the present invention. The data structure shown in FIG. 6 is maintained in the main processing part 10, and the data structures shown in FIG. 7 and FIGS. 8A and 8B are used in the classification engines 20.

In the shown data structures, there is no need to store rules in each node. As shown in FIGS. 8A and 8B, prefix pairs, k-way search values, and pointers are maintained in the classification engines 20.

The main processing part 10 sends update instructions to all the classification engines 20 through a broadcasting bus 12. These update instructions are used by the classification engines 20 to instruct the changes of contents of a memory (and/or TCAM).

Figure 5:
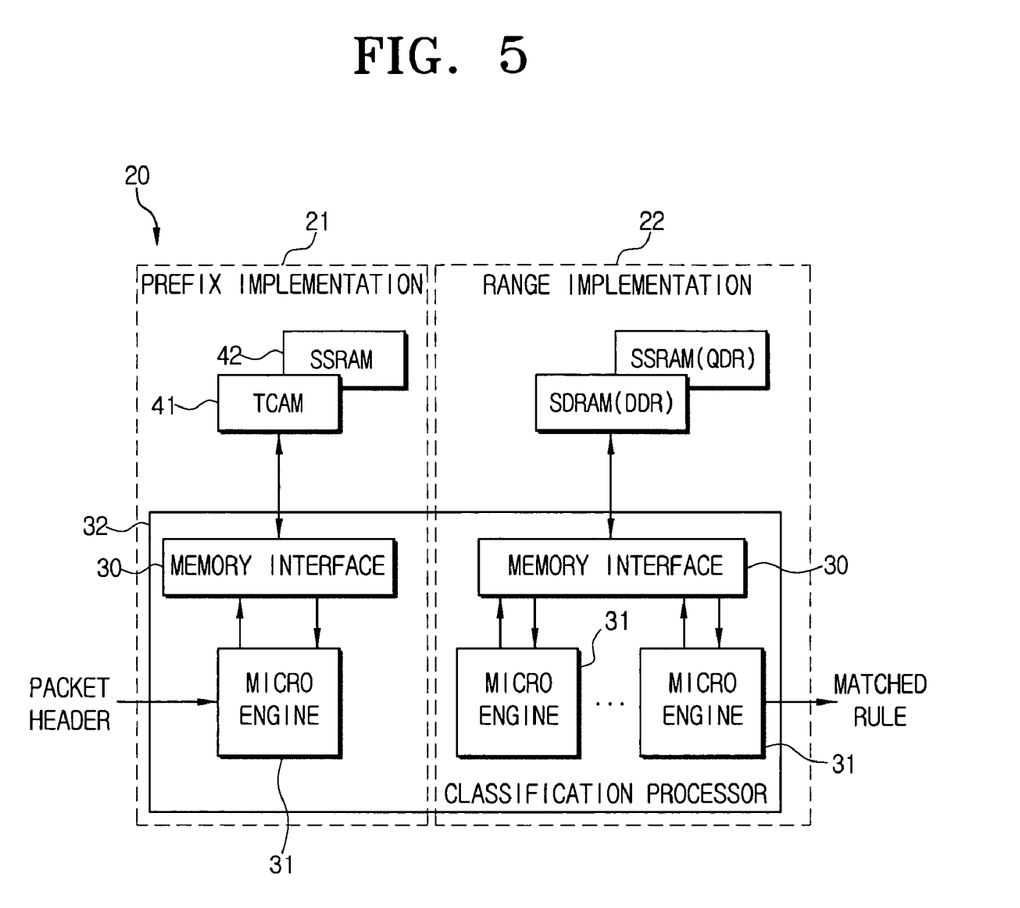
FIG. 5 is a view for showing a structure of the classification engines of FIG. 4.

FIG. 5 is a view for showing a structure of each classification engine 20 of FIG. 4.

Each classification engine 20 consists of a part 21 for processing a prefix lookup represented by an IP source/destination address lookup, and a part 22 for processing a second classification belonging to a result of a first classification. In the second classification, in order to process the range lookup, a lower micro engine is provided to proceed with classifications by field.

In order to perform the second classification, the k-way search method having an appropriate value according to usage and specification is used.

The classification engine 20 consists of a classification processor 32, a TCAM 41, and an external memory having a general memory (e.g., SDRAM and/or SSRAM) 42.

The classification processor 32 is provided therein with main components of micro engines 31 and memory interfaces 30. The micro engine 31 is a RISC processor for specific applications or for general purposes. The data structures of the classification engine are stored in the external memory. The internal micro engine 31 performs control functions with respect to query operations, and accesses data through the memory interface 30.

A packet header having all extracted fields enters the classification processor 32 on the left in FIG. 5. A first micro engine 31 takes a first k field implemented in a prefix format, and sends the taken field to the TCAM 41. The TCAM 41 carries out a search, based on the received field, and returns a search result to the first micro engine 31. A few micro engines send the result to the second stage existing with respect to the k-way search on next field implemented in the range. By way of example, one micro engine 31 of FIG. 5 is dedicated to each field in the second stage. However, in actual operations, one micro engine can accommodate more than one field. The number of micro engines is determined based on, for example, an external memory bandwidth, micro engine rate, and average bandwidth which are necessary to search respective fields.

In addition to the query functions, the classification engines may need to change the contents of the external memory based on an update instruction transmitted from the main processing part. There are two methods for solving contentions between these two tasks. a) In one method, a classification engine interleaves tasks that can execute queries or updates at any time. This method can be realized when the update cost is small with respect to time consumption. b) In another method, two copies of a data structure are created in a memory. One copy is used for queries, while the other copy is used for updates. If one update operation is completed, the updated copy is diverted for queries, and the other copy is used for updates. This method is applied when the update cost is large enough to significantly lower the query performance of the interleaving method.

Next, an illustrative embodiment of a field-level-trie classification structure and a field-level-trie classification method will be described in detail with reference to the drawings.

A field-level-trie (FLT) classification structure is dedicated to classify multi-field classifiers, and each field is realized in individual prefix implementations and range implementations.

An exemplary classifier having 4 fields and 7 rules is shown in Table 2.

TABLE 2

| Rule | F1 | F2 | F3 | F4 |
| --- | --- | --- | --- | --- |
| $R_1$ | 00* | 110* | 6 | [10, 12] |
| $R_2$ | 00* | 11* | [4, 8] | 15 |
| $R_3$ | 10* | 1* | 7 | 9 |
| $R_4$ | 0* | 01* | 10 | [10, 12] |
| $R_5$ | 0* | 10* | [4, 8] | 15 |
| $R_6$ | 0* | 1* | 10 | [10, 15] |
| $R_7$ | * | 00* | 7 | 15 |

In Table 2, two fields F1 and F2 are implemented in prefix form, and two fields F3 and F4 are implemented in range form. A data structure configured in the FLT for the above classifier is shown in FIG. 6.

Individual packets are classified according to rules which are set out in a corresponding field of each level. The classification job is completed if an individual packet passes through the fields of all the given levels, so that the individual packet is assigned a fixed rule.

Next, the field-level-trie data structure of FIG. 6 is described in detail. The field-level-trie data structure is defined to have the following attributes:

1. The field level tries are organized in a hierarchical structure field by field. A trie depth is identical to the number of fields (d). There are four node levels organized from F1 to F4 as shown in FIG. 6. In FIG. 6, the nodes on the bottom do not form any separate level. FIG. 6 indicates which rules are matched when a query procedure ends at the fourth level.

2. Each node in the tries include a rule set which is a subset of a rule set of a parent node. The root node of the tries is defined to include all the rules.

3. A node a of the ith level (the root node is defined as being in the first level) generates its child node in the (i+1)th level based on a value of an Fi field of all the rules included in the node a.

There are two different steps for the child node generations based on the specified field Fi.

(a) If the field Fi is specified with a prefix, the number of child nodes of the node a becomes identical to the number of different values of the field Fi in a rule set of the node a. Therefore, respective child nodes are combined with different prefixes. If a child node b is combined with a prefix (p), a value of the field Fi of a rule r (r is also included in the node a) included in a rule set of the node b becomes the same or becomes a prefix of the node b.

For example, in FIG. 6, the root node includes all seven rules, and, since there are four different prefixes such as *, 0*, 00*, and 10* in the F1 field, four child nodes are generated.

A node X combined with the prefix 0* includes four rules R4~R7. A value of the F1 field for R4~R6 is 0*, which has been combined with a prefix. A value of the F1 field for R7 is *, which is a prefix of 0*.

(b) If the Fi field is specified with a range, the range is projected onto a number line, and an interval of one set is obtained. Intervals I and a child node b are generated. The rule r is included in a rule set of the node b, and the range specified by the Fi field of the rule r includes the interval I. For example, a node y generates three child nodes such as a single point node y' having an interval [10, 10], a node y''' having an interval [6, 6], and a node y'' having intervals [4, 5] and [6, 7].

The rule set of the node a in the ith level becomes particular among the rule sets of all the nodes existing in the same level.

If two nodes b and c have the common child node a in the (i+1)th level, only one node a is generated and shared. When a node is pointed to by multiple pointers, it can be seen in FIG. 6 that a node is shared. The node sharing is similar to the switch pointer mechanism in the grid-of-tries, but the method proposed in the present invention obtains the node sharing in a field level whereas the grid-of-tries creates the node sharing in a bit level. Since the field level sharing inevitably accompanies duplicates, it improves a query performance, but requires more storage. As shown in FIG. 6, the rule R7 is stored in four nodes of the level 2.

Next, a node structure and a query procedure for the field level trie will be described.

Each field is generally implemented in a prefix or range format, and each implementation has its own suitable data structure and search algorithm. Therefore, a classifier has two groups of fields. The first group is a prefix implementation and the second group is a range implementation.

In the classifier shown in Table 2, the F1 and F2 fields form a first group, and the F3 and F4 fields form a second group. The field level tries are organized in a structure such that the fields of the first group appear in the upper level and the fields of the second group appear in the lower level.

For the first group including the fields of prefix format, a TCAM is used to store and search for prefixes. Further, the TCAM can accommodate multiple fields at the same time, so that a query on the fields of the first group can be executed through only a one-time connection to the memory.

FIG. 7 is a view for showing a shortened data structure, that is, combining levels 1 and 2 for a prefix lookup of FIG. 6 by applying the TCAM in the classification engines of FIG. 5. In FIG. 7, only one level exists for fields F1 and F2. A root node has the seven child nodes first appearing in the third level in FIG. 6. In FIG. 7, each of the second level nodes has a prefix pair combining a prefix of the F1 level and a prefix of the F2 level with each other. Such a prefix pair forms a format of TCAM entry contents. The prefix pair is derived from the trie structure of FIG. 6. In correspondence to the nodes of the second level of FIG. 7, with respect to the node X in the third level of FIG. 6, a path the smallest sum of prefix lengths is found from the root node to the node X. Prefixes along this path form prefix pairs for the nodes of FIG. 7. All the prefix pairs are arranged in the order that a prefix length is decreased in the TCAM. Prefix pairs having the same length have an arbitrary order in their correlation. Table 3 shows TCAM contents for the exemplary trie structure of FIG. 7. It is decided that an appropriate node in the second level continues the entire query procedure.

The features of the FLT and the TCAM are combined and steps are reduced, and Table 3 is an example that shows the prefix lookup part of Table 2 implemented in the TCAM.

TABLE 3

| Entries | Prefix pairs | Node names | Sums of length |
|---|---|---|---|
| 1 | 00*/110* | f | 5 |
| 2 | 00*/11* | e | 4 |
| 3 | 10*/1* | g | 3 |
| 4 | 0*/01* | d | 3 |
| 5 | 0*/10* | c | 3 |
| 6 | 0*/1* | b | 2 |
| 7 | */00* | a | 2 |

The TCAM arranges the prefix pairs in a decreasing order, so that an accurate search result is secured in the TCAM, and it is decided that an accurate node in the second level continues the entire query procedure.

FIG. 8A and FIG. 8B are views for explaining a principle of the k-way search being carried out in the micro engines for range lookup in the classification engine of FIG. 5. The size of a memory interface 30 determines the value k for the k-way search which dominates the major performance of the second classification. The larger the value k is, the better, in given environments.

If a packet header to be classified is given, fields belonging to the first group are extracted and then given to the TCAM for a search. An output from the TCAM indicates a next node to be connected in the second level. Since the TCAM accommodates all the prefix format fields, the rest of the query procedure depends on range implementation fields. As for the nodes existing in the second or lower level, a binary search trie (or a k-way search trie depending on an external memory bandwidth) is used for each node. For example, there is a node a in the $i^{th}$ level of a trie, wherein i>1. The $i^{th}$ field of the rules in the rule set of the node a is projected onto a number line, and seven intervals I1~I7 having eight terminals E1~E8 are obtained as shown in FIG. 8A. If a 3-way search trie is used to organize these intervals, a trie structure is obtained as shown in FIG. 8B. This is a 2-layer trie having four blocks. Each block includes a k-pointer and (k−1) terminals. A pointer in an internal block points to a different block in the k-way search trie, whereas a pointer in a leaf block points to a node of a next level in the field level trie. A description of an exemplary search procedure in the k-way search trie follows.

If a pointer P exists in the interval I3, the search procedure starts from a root block x. The comparison of the pointer P to two terminals $E_3$ and $E_6$ stored in the block x shows $E_3<P<E_6$ in their relations. The first pointer combined with the interval I3 comes behind a node of a next level in the field level trie.

The k-way search is an effective algorithm for a range lookup matter. The number of layers of the k-way search trie can be determined in $\log_k M$, and M is the number of intervals. Each block in the k-way search trie is a basic unit stored in the memory, a one-time memory connection is required for a one-time read/write operation. Therefore, during the search procedure, the number of memory connections is the same as the number of layers of the k-way search trie. Here, the number k is limited by a block size, and the block size is determined by a memory bandwidth.

The query procedure of the field level trie starts from the TCAM for all the fields having prefix implementations. After the fields having range implementations are reached, the query procedure progresses level by level, one level at a time, and the k-way search is executed to search for a next child node. The query procedure is terminated when the leaf node is met, and matched rules are returned as a result.

The present invention develops tries in a unit of a field so that it can implement packet classifications for high-speed networking with excellent query performance secured. The present invention can process approximately a half-million classifier rules.

What is claimed is:

1. A packet classification apparatus using a field level tries structure, said apparatus comprising:
   a main processing part for generating and maintaining the field level tries structure, which organizes a multi-field packet by field in a hierarchical structure for classifications; and
   a plurality of classification engines, each classification engine provided with a first classification part for performing queries and updates and processing a prefix lookup represented by an IP address lookup, and a second classification part for proceeding with packet classification by field based on a result of the first classification part in order to process a range lookup belonging to the result.

2. The packet classification apparatus as claimed in claim 1, wherein each classification engine includes a classification processor and a memory.

3. The packet classification apparatus as claimed in claim 2, wherein the main processing part and the classification engines are connected through a broadcasting bus.

4. The packet classification apparatus as claimed in claim 1, wherein the first classification part of each classification engine stores fields of a prefix format and uses a ternary content addressable memory (TCAM) to search the stored fields.

5. The packet classification apparatus as claimed in claim 1, wherein the second classification part uses a k-way search scheme having an appropriate value k based on usage and specification.

6. The packet classification apparatus as claimed in claim 5, wherein the value k is determined based on a size of a memory interface of the second classification part.

7. The packet classification apparatus as claimed in claim 3, wherein the main processing part sends an update instruction to the classification engines through the broadcasting bus, and each classification engine instructs a change of contents of a memory of the classification engine upon receipt of the update instructions.

8. The packet classification apparatus as claimed in claim 1, wherein the field level tries structure is organized as a structure wherein one or more fields of a first group appear in an upper level of the structure and one or more fields of a second group appear in a lower level of the structure.

9. The packet classification apparatus as claimed in claim 8, wherein the fields of the first group are fields in a prefix format.

10. The packet classification apparatus as claimed in claim 8, wherein the fields of the second group are fields in a range format.

11. The packet classification apparatus as claimed in claim 1, wherein if two nodes in any level have a common child node, only one node, corresponding to the common child node, is generated and shared in the field level tries structure.

12. The packet classification apparatus as claimed in claim 1, wherein in the field level tries structure, a level for the prefix lookup exists as only one level having a plurality of prefixes combined with each other.

13. A packet classification apparatus using a field level tries structure, said apparatus comprising:

means for generating and maintaining the field level tries structure, which organizes a multi-field packet by field in a hierarchical structure for classifications;

means for performing queries and updates and processing a prefix lookup represented by an IP address lookup; and means for proceeding with packet classification by field based on a result of the prefix lookup in order to process a range lookup based on the result.

* * * * *